US007589725B2

(12) United States Patent
Snyder et al.

(10) Patent No.: US 7,589,725 B2
(45) Date of Patent: Sep. 15, 2009

(54) SOFT SHADOWS IN DYNAMIC SCENES

(75) Inventors: John M. Snyder, Redmond, WA (US); Peter-Pike J. Sloan, Bellevue, WA (US); Baining Guo, Bellevue, WA (US); Kun Zhou, Beijing (CN); Rui Wang, Hangzhou (CN); Xinguo Liu, Hangzhou (CN); Zhong Ren, Beijing (CN); Bo Sun, New York, NY (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 11/478,913

(22) Filed: Jun. 30, 2006

(65) Prior Publication Data

US 2008/0001947 A1    Jan. 3, 2008

(51) Int. Cl.
*G06T 15/50* (2006.01)
(52) U.S. Cl. ...................................................... 345/426
(58) Field of Classification Search ........................ None
See application file for complete search history.

(56) References Cited

U.S. PATENT DOCUMENTS

| | | | |
|---|---|---|---|
| 6,252,608 B1 | 6/2001 | Snyder et al. | |
| 6,646,640 B2 * | 11/2003 | Nagy | 345/426 |
| 6,903,741 B2 | 6/2005 | Corbetta | |
| 2002/0003538 A1 * | 1/2002 | Fuchigami | 345/426 |
| 2002/0047843 A1 * | 4/2002 | Higashiyama et al. | 345/426 |
| 2002/0180727 A1 * | 12/2002 | Guckenberger et al. | 345/418 |
| 2003/0071812 A1 | 4/2003 | Guo et al. | |
| 2003/0095122 A1 | 5/2003 | Herken et al. | |
| 2003/0179197 A1 | 9/2003 | Sloan et al. | |
| 2004/0207623 A1 | 10/2004 | Isard et al. | |
| 2004/0239673 A1 | 12/2004 | Schmidt | |
| 2005/0128496 A1 | 6/2005 | Bala | |
| 2006/0034540 A1 | 2/2006 | Zavadsky et al. | |
| 2006/0279570 A1 * | 12/2006 | Zhou et al. | 345/426 |

OTHER PUBLICATIONS

Debevec, P., Reinhard, E., Ward G., Pattanaik, S., High Dynamic Range Imaging, 2004, SIGGRAPH 2004, pp. 1-276.*
Durand, F., Drettakis, G., Puech, C., Fast and accurate hierarchical radiosity using global visibility, 1999, ACM Transactions on Graphics, vol. 18(2), pp. 128-170.*
Sloan, P., Hall, J., Hart, J., Snyder, J., Clustered principal components for precomputed radiance transfer, 2003, ACM Trans. Gr. vol. 22, No. 3, pp. 382-391.*
Zhou, K., Hou, K., Hu, Y., Lin, S., Guo, B., Shum, H., Precomputed shadow fields for dynamic scenes, 2005, ACM Trans. Gr. vol. 24, No. 3, pp. 1196-1201.*
Kirsch, et al., "Real-Time Soft Shadows Using a Single Light Sample", http://wscg.zcu.cz/wscg2003/Papers_2003/B19.pdf.
Brabec, et al., "Single Sample Soft Shadows using Depth Maps", http://www.graphicsinterface.org/cgi-bin/DownloadPaper?name=2002/107/paper107.pdf.
Zhou, et al., "Precomputed Shadow Fields for Dynamic Scenes" http://research.microsoft.com/users/kunzhou/publications/ShadowFields.pdf, Jul. 2005.

* cited by examiner

*Primary Examiner*—Ulka Chauhan
*Assistant Examiner*—Said Broome

(57) ABSTRACT

The present soft shadowing technique pre-computes visibility of blockers using a log of a spherical harmonic visibility function. These logs can then be accumulated and exponentiated in real-time to yield the product visibility vector over all the blockers. The product visibility vector is combined with the light intensity and surface reflectance to determine shading at a receiver point in a computer-generated scene.

20 Claims, 9 Drawing Sheets

800
SPHERICAL
HARMONICS
EXPONENTIATION $$\exp_*(f) = 1 + f + \frac{f^{2*}}{2} + \frac{f^{3*}}{3!} + \ldots$$ — 802

812 → $$\exp_*(f) = \exp\left(\frac{f_0}{\sqrt{4\pi}}\right)\exp_*(\hat{f})$$

814 → $$\exp_*(f) \approx \left(\exp_*\left(\frac{f}{2^p}\right)\right)^{2^p*}$$  — 810

816 → $$h_*(f) \approx (h_0 1 + h_2 f^{2*} + h_4 f^{4*} + \cdots) + f * (h_1 1 + h_3 f^{2*} + h_5 f^{4*} + \cdots)$$

$$\exp_*(f) \approx \exp\left(\frac{f_0}{\sqrt{4\pi}}\right)\left(a(\|\hat{f}\|)1 + b(\|\hat{f}\|)\hat{f}\right)$$ — 820

*Fig. 8*

SOFT SHADOWS IN DYNAMIC SCENES

BACKGROUND

Computer-generated scenes continue to become increasingly more realistic. One technique that greatly increases the realism of the scenes is the use of soft shadows. Soft shadows arise from area light sources for which the lighting's low-frequency directional dependence predominates over the effect of its high frequencies. Conversely, hard shadows arise from point or directional (i.e. high frequency) light sources. Several techniques exist to generate hard shadows in real-time such as shadow buffers. Hard shadow techniques can be extended to render soft shadows by numerically integrating over many light directions constituting the area light source. Unfortunately, these techniques do not generate soft shadows in real-time because integrating over a large light source area requires too many directional samples and thus too many rendering passes.

One recent real-time approach computes soft shadows using shadow and illumination fields. Shadow fields describe the shadowing effects of an individual scene entity at sampled points in its surrounding volumetric space. The illumination field for a local light source is referred to as a source radiance field (SRF). The SRF consists of cube maps that record incoming light from the illuminant at sample points in a surrounding volumetric space. An infinitely-distant environment map is a special case that can then be represented as a single SRF cube map. Each object in the scene is represented by an object occlusion field (OOF). The OOF records the occlusion of radiance by the object as viewed from sample points around the object. The soft shadows are then computed at runtime by rotating each blocker visibility function into the local coordinate frame and computing the spherical harmonic product over all of the blockers. While this technique improves the generation of soft shadows in dynamic scenes, the technique is still too computationally complex (e.g., spherical harmonics rotation and products) to allows the soft shadows to be efficiently generated when there are several objects moving in the scene.

SUMMARY

The present soft shadowing technique pre-computes visibility of blockers using a log of a spherical harmonic visibility function. These logs can then be accumulated and exponentiated in real-time to yield the product visibility vector over all the blockers. The product visibility vector is combined with the light intensity and surface reflectance (bi-directional reflection distribution functions (BRDF)) to determine shading at a receiver point in a computer-generated scene. Diffuse surfaces are a special case for which only the surface normal, rather than a general BRDF, is required at the receiver point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a set of exemplary spherical harmonics exponentiation calculations suitable for use in the soft shadowing process of FIG. 3.

DETAILED DESCRIPTION

The present soft shadowing technique determines the shading that is applied at a point within a scene based on shadows that are cast from several objects (as approximated by a set of blockers), the lighting within the scene, and the surface BRDF (surface normal for diffuse surfaces) at the point. The shadows of the blockers are each represented by a visibility function that determines the amount of light the blocker blocks from reaching the point being shaded. In contrast with techniques that numerically integrate over a large number of lighting directions and test blocker visibility in each direction, the present technique accumulates the visibility in log space and computes the spherical harmonic exponential in real-time to arrive at the product visibility vector over all the blockers. This decreases the per-blocker computation which allows the present technique the ability to handle more blockers and the ability to map the computation to a graphics processing unit in a single shading pass. As will be described, the present technique is applicable to any type of object, including objects that have a dynamic geometry, such as deforming characters whose motion may not be known in advance. These and other aspects of the present soft shadowing technique are now described in detail.

Figure 1:
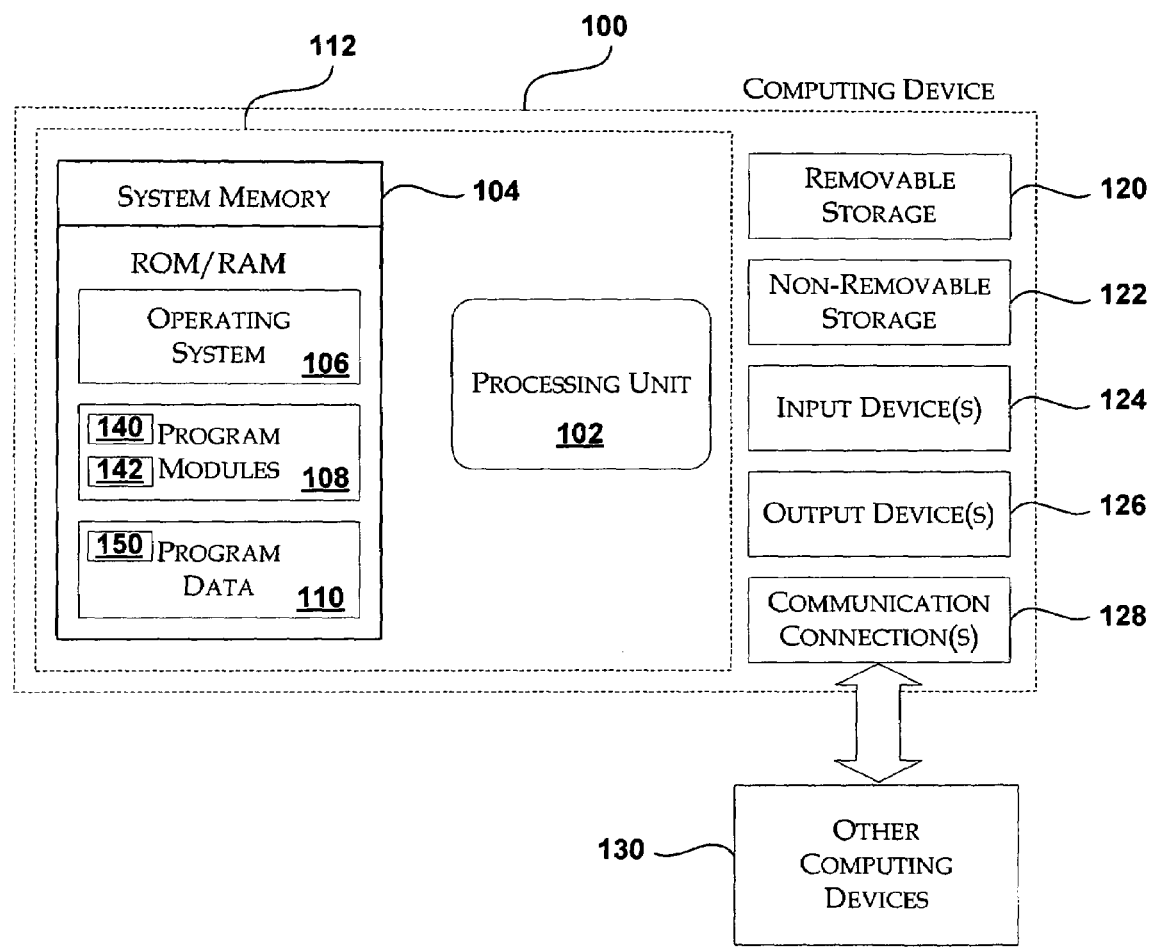
FIG. 1 is an illustrative system that may be used to implement the soft shadowing technique described herein in accordance with one embodiment.

FIG. 1 is an illustrative system that may be used to implement the soft shadowing technique described herein in accordance with one embodiment. The system includes a computing device, such as computing device 100. Computing device 100 represents any type of computing device such as a personal computer, a laptop, a server, a game console, a handheld or mobile device (e.g., a cellular phone, digital assistant), and the like. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. For the present soft shadowing technique, the program modules 108 may include one or more components 140 for implementing the soft shadowing technique. In addition, program modules 108 may include a graphics application 142 that utilizes the soft shadowing technique implemented within components 140. Alternatively, the operating system 106 may include one or more components for implementing the soft shadowing technique. Program data 110 may include a tabulation of visibility logs 150. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 may also have input device(s) 124 such as keyboard, mouse, pen, voice input device, touch input device, etc. Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
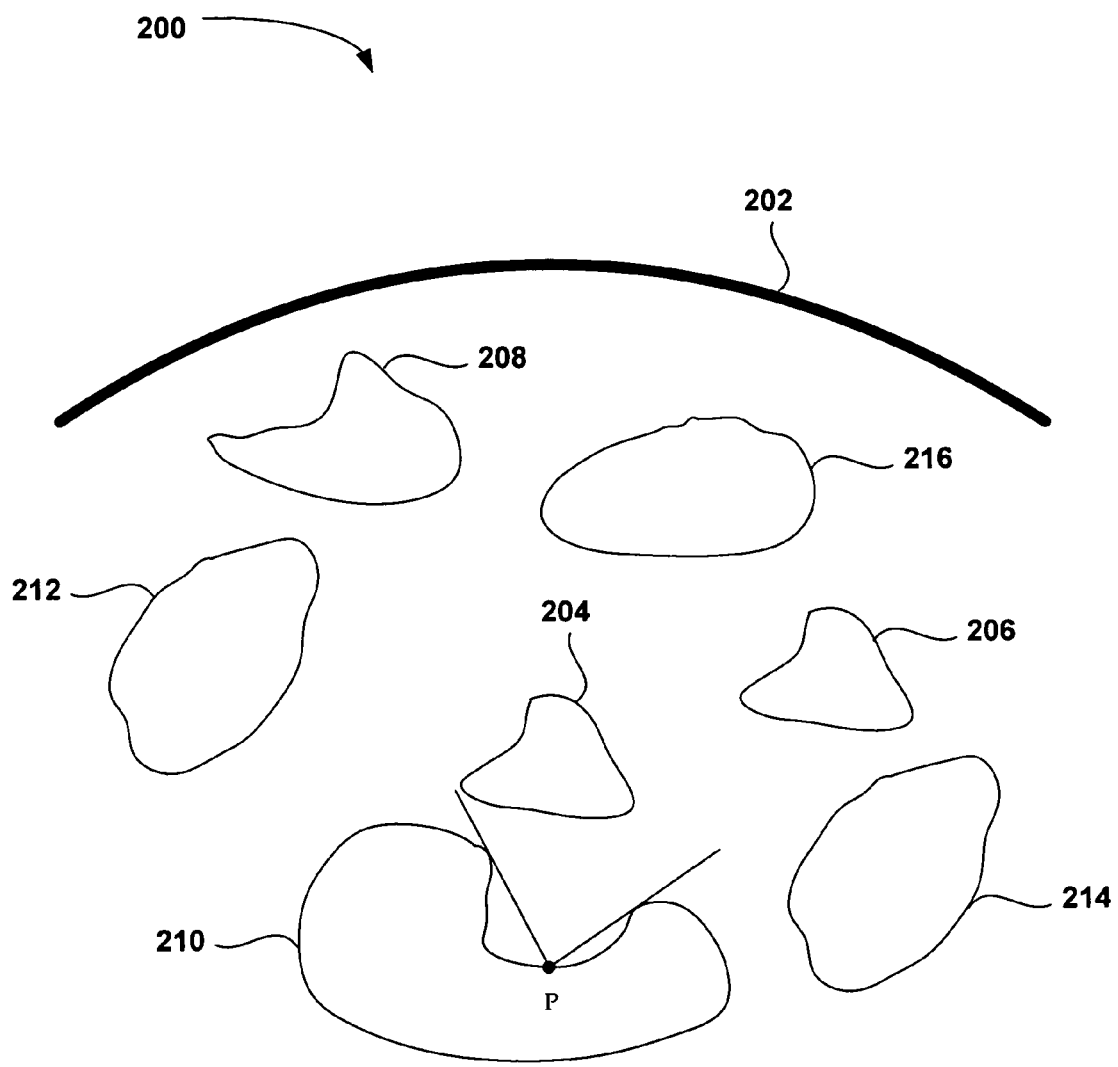
FIG. 2 is a graphical representation of a scene having a large area light source, local light sources, and objects which block the light from a receiver point.

FIG. 2 is a graphical representation of a scene 200 having a large area light source 202 and objects 204-216. In FIG. 2, object 210 is shown with a receiver point p at which soft shadowing is applied. In overview, soft shadowing depends on lighting, reflectance, and visibility. The present soft shadowing technique focuses on calculating the visibility efficiently so that soft shadowing may be applied to scene that has numerous moving objects which block the light received at a point p. For example, in dynamic scenes, objects 204-216 may each move within the scene and may deform and be articulated. Therefore, the visibility may rapidly change and vary significantly among different scene points.

In overview, the visibility of the light source 202 from the receiver point p needs to be computed with respect to the occluding objects (i.e., objects 204-216) in the scene 200. While this conventionally requires tracing rays between the illuminant and the receiver point, new techniques have efficiently calculated the visibility using simple operations on pre-computed data. For example, one technique uses pre-computed shadow fields. While using pre-computed shadow fields is more efficient than ray tracing, the technique is still limited to roughly six rigidly-moving blocker objects to maintain real-time performance. The limitation is due mainly because it requires the shadow fields to be aligned to the scene positions using coordinate transformations and multiplications of each shadow field to obtain the aggregate visibility of all the blockers. In contrast, as will be described below, the present soft shadowing technique does not require expensive rotation operations and products.

The present technique was formulated after recognizing that the visibility functions could be represented as logs which could then be added in real-time to give a good approximation of the aggregate visibility. Thus, the present technique accelerates the process of soft shadowing and allows soft shadowing to be implemented in real-time using the graphics processing unit.

Before describing the present technique in further detail, the following is an overview of some the concepts and terminology used though-out the following discussion. Spherical harmonics are used to represent low-frequency spherical functions, such as radiance incident at a point and blocker visibility functions which modulate distant radiance. Given a real spherical function f(s), the spherical function may be projected to determine a vector f that represents its low-frequency behavior using the following equation:

$$f = \int_S f(s) y(s) ds \tag{1}$$

where y(s) is the vector of the spherical harmonic basis function. The spherical harmonic basis functions are orthogonal polynomials in s(x,y,z) restricted to the sphere s∈S. An order n spherical harmonic projection has $n^2$ vector coefficients. Conversely, given a spherical harmonic vector f a continuous spherical function $\tilde{f}(s)$ can be reconstructed using the following equation:

$$\tilde{f}(s) = \sum_{i=0}^{n^2-1} f_i y_i(s) = f \cdot y(s) \tag{2}$$

For computing combined shadowing effects of multiple blockers directly in the spherical harmonic basis, without resorting to numerical integration over directions or performing complicated geometric clipping operations, spherical harmonic products and a triple product tensor may be used. The spherical harmonic product, denoted f·g, represents the order-n projected result of multiplying the reconstruction of two order-n vectors, f times g, as follows:

$$f * g = \int_S f(s) g(s) y(s) ds \Rightarrow (f * g)_i = \sum_{jk} \Gamma_{ijk} f_j g_k \tag{3}$$

The spherical harmonic triple product tensor, $\Gamma_{ijk}$, is defined using the following equations:

$$\Gamma_{ijk} = \int_S y_i(s) y_j(s) y_k(s) ds. \tag{4}$$

The spherical harmonic triple product tensor is a symmetric, sparse, order-3 tensor. Equation (4) above incurs truncation error because the product of two order-n vectors is actually order 2n−1. Spherical harmonic products are expensive operations, even at low orders.

A spherical harmonic product matrix, $M_f$, given a spherical harmonic vector f, may be defined. The product matrix is a symmetric matrix which encapsulates spherical harmonic product with f. In other words, f·g=$M_f$g for an arbitrary vector g. $M_f$ is defined by the following equation:

$$(M_f)_{ij} = \sum_k \Gamma_{ijk} f_k. \quad (5)$$

Figure 3:
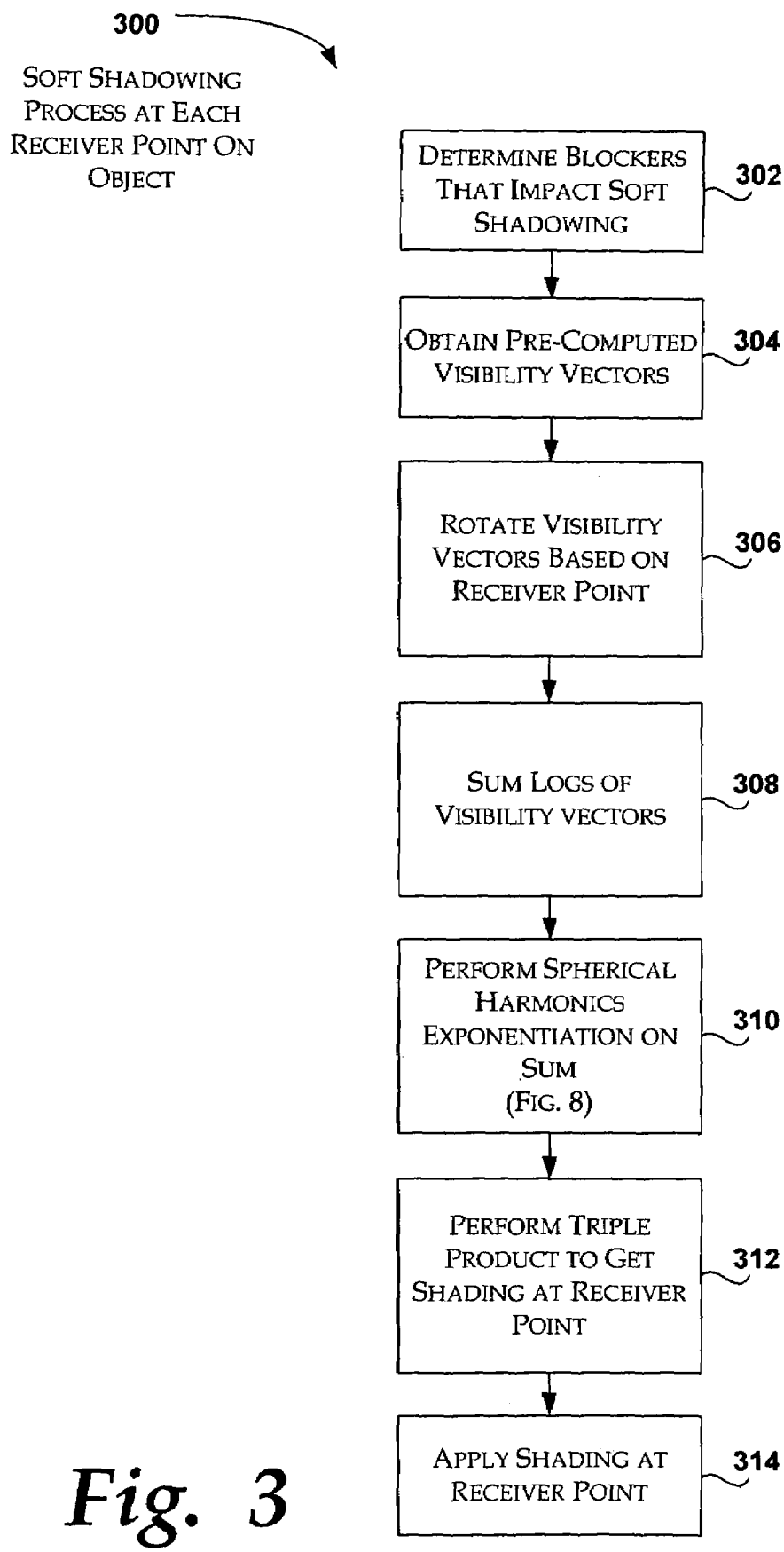
FIG. 3 is a flow diagram illustrating an exemplary soft shadowing process performed at each receiver point of an object.

Based on these concepts, the present soft shadowing technique was formulated. FIG. 3 is a flow diagram illustrating an exemplary soft shadowing process 300 performed at each receiver point of an object. Prior to soft shadowing, the shape of each object is represented by a set of blockers which may take any arbitrary shape. One embodiment for representing the shape of the objects using a set of blockers is illustrated later in conjunction with FIG. 5. As will be described, in that embodiment, the arbitrary shape is a sphere. Process 300 begins at block 302 where the blockers that impact the soft shadow at receiver point p are determined. Briefly, determining the blockers that impact the soft shadow, described later in detail in conjunction with FIG. 7, distinguishes blockers that correctly self-shadow from blockers that incorrectly self-shadow at receiver point p. Processing continues at block 304.

At block 304, a pre-computed visibility log for each blocker that affects the shading at the receiver point is obtained. One embodiment for pre-computing the visibility log for blockers is described later in conjunction with FIG. 4. In overview, in one embodiment, at run-time, receiver point p is assumed to be shadowed by one or more blockers each having a sphere of radius r centered at P. The pre-computed log visibility vector, f(p,P,r) for one single sphere blocker is determined with the following equation:

$$\theta(p,P,r)=\sin^{-1}(r/\|P-p\|)$$

$$s(p,P)=(P-p)/\|P-p\|$$

$$f(p,P,r)=F(\theta(p,P,r))y(s(p,P)) \quad (6)$$

where F(θ) is the diagonal matrix corresponding to vector f*(θ). Vector f*(θ) is determined based on the visibility function g(θ) for a canonical circle centered at the z axis. The spherical harmonic visibility function for circles of angular radius θ centered around the z-axis is given by the following equation:

$$g(s, \theta) = \begin{cases} 0, & \text{if } s \cdot (0, 0, 1) \geq \cos(\theta) \\ 1, & \text{otherwise.} \end{cases} \quad (7)$$

Projecting g yields many zero components because of its circular symmetry around z. The visibility function g may then be represented using doubly-indexed spherical harmonic notation, $g_{lm}$, where l represents the band index (l=0, 1, . . . , n−1) and m indexes the 2l+1 component of band l. This visibility function is circularly symmetric around z (i.e., $g_{l0}$ components are non-zero). Therefore, the visibility function g can be represented with n rather than $n^2$ components via vector $g_1(\theta)$. This defines the g* vector as a function of θ. The logs of the circle visibility vector is then the f* vector defined as f*=log(g*). Thus, as will be described, the logs of circle visibility vectors f* are tabulated rather than their direct projections. These pre-computed visibility logs are tabulated and stored. The tabulated data is then queried in real-time to obtain the visibility log for each blocker that affects the shading at the receiver point. Processing continues at block 306.

At block 306, each visibility log that is obtained is rotated based on the direction of the receiver point. When the blocker geometry is represented using a set a spheres, the visibility function may be rotated from z to an arbitrary axis z' via a rotation rule as follows:

$$g_{z*}(\theta)=G(\theta)y(z')=\text{diag}(g_0^*(\theta),g_1^*(\theta),g_1^*(\theta),g_1^*(\theta),\ldots)y(z'). \quad (8)$$

This allows the visibility for circles of any angular radius and around any axis to be defined using a one dimensional table of n projection coefficients, g(θ), and a two dimensional table of $n^2$ spherical harmonic basis functions, y(s). In another embodiment, the visibility is evaluated without being tabulated. Processing continues at block 308.

At block 308, the visibility log vectors are summed. Accumulating the log involves vector sums which are independent of the blocker ordering and much cheaper than spherical harmonic products. Therefore, the present soft shadowing technique significantly reduces the per-blocker computational costs. Processing continues at block 310.

At block 310, a spherical harmonic exponentiation is performed on the sum to obtain the total product visibility vector over all the blockers. While the exponentiation calculation is an expensive operation, it only needs to be performed once for each receiver point. For order-n spherical harmonic vectors, this reduces per-blocker computation from $O(n^5)$ to $O(n^2)$. Thus, for order-4 spherical harmonic vectors, this results in less than $1/20^{th}$ the per-blocker cost. This reduction allows the present soft shadowing technique the ability to handle complicated scenes with many more blockers than prior techniques could handle. Processing continues at block 310.

At block 310, a triple product of lighting, reflectance, and visibility is performed to obtain the shading at the receiver point. For diffuse surfaces, shading is determined by computing (H(N),L,g) where L is the light vector, g is the total product blocker visibility vector from block 310, and H(N) is the irradiance weighting function given the surface normal N as determined using the following conventional equation:

$$H(N) = \frac{1}{\Pi}\int_S \max(s \cdot N, 0)y(s)ds. \quad (9)$$

For diffuse surfaces in lighting environments, $L_H(N)=L*H(N)$ may be tabulated. At runtime, $L_H$ may then be indexed at the receiver normal $N_p$ to obtain the cosine-weighted incident radiance at point p. This result is dotted with the exponentiated blocker vector g to produce the shadowed result $L_H(N_p)$·g. However, if the lighting changes every frame, tabulating $L_H$ may be difficult. Therefore, in a further refinement, shading may instead by calculated by forming the light's product matrix $M_L$ and computing $(M_L g) \cdot H(N_p)$. Processing continues at block 314.

At block 314, the shading is applied at the receiver point. The total product blocker visibility vector may also be used to shade other types of bi-directional reflection distribution functions (BRDFs) or textural detail.

Figure 4:
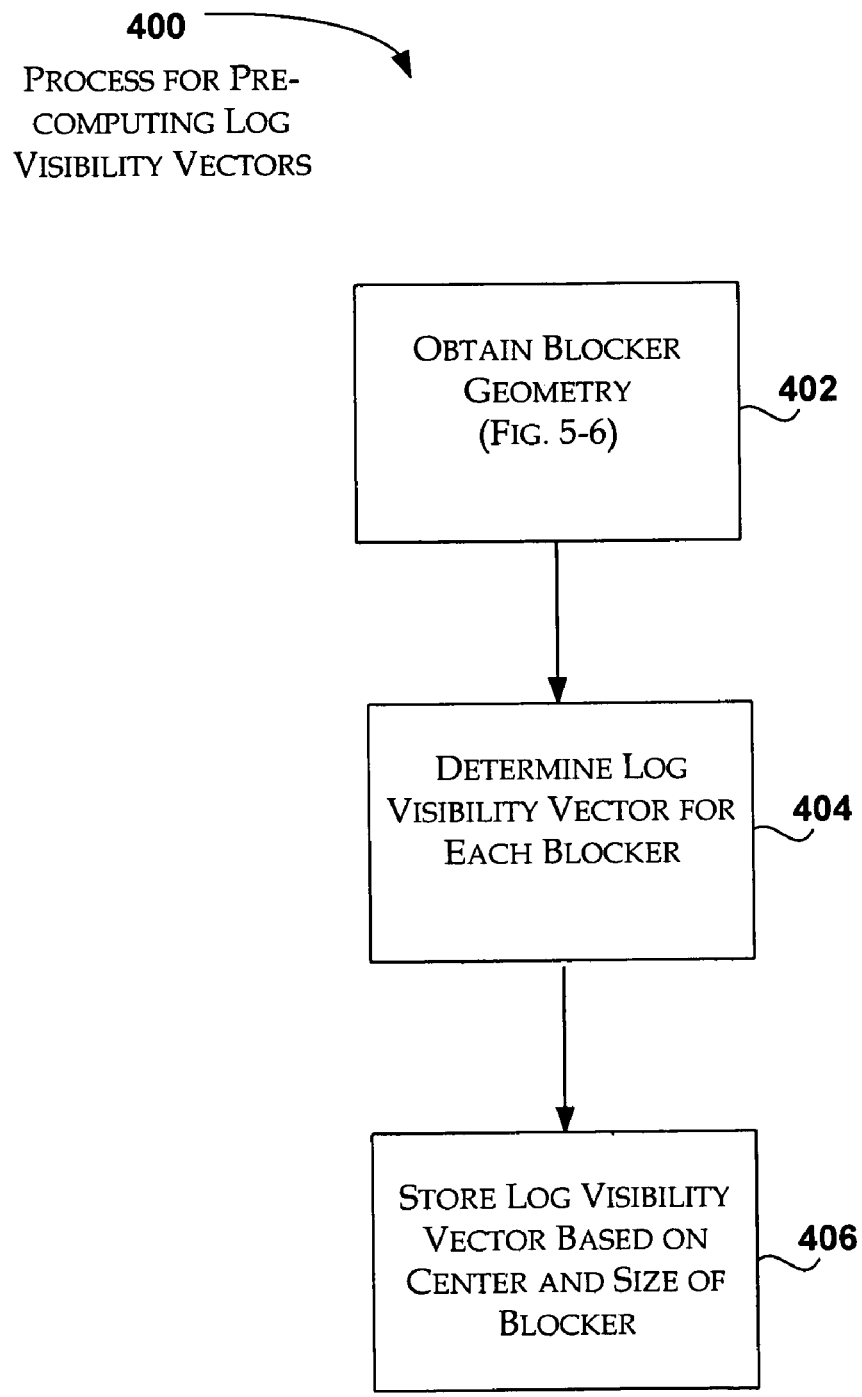
FIG. 4 is a flow diagram illustrating a process for determining the log visibility vectors which are pre-computed for use during the soft shadowing process of FIG. 3.

FIG. 4 is a flow diagram illustrating a process for determining the log visibility vectors which are pre-computed for use during the soft shadowing process of FIG. 3. Process 400 begins at block 402 where a blocker geometry is obtained.

The blocker geometry may take any arbitrary shape. For example, the blocker geometry may utilize conventional blocker geometry, such as octree and medial axis. In another embodiment, illustrated in FIG. 5, the blocker geometry utilizes a set of varying-sized spheres to represent the object. The arbitrary shapes of the blocker geometry are referred to as blockers because they block the light from reaching the receiver point p. Once the blocker geometry is obtained, processing continues at block 404.

At block 404, the log visibility vector for each blocker in a scene is determined. Briefly, the visibility vector represents the fraction of light that a blocker blocks from reaching receiver point p. These vectors represent low-frequency visibility of blockers in the spherical harmonic basis. Processing continues at block 406.

At block 406, the log visibility vector for each blocker may be stored based on properties of the blocker. In the embodiment in which the blocker geometry utilizes spheres, the properties that are stored may include the sphere's center position and radius. This allows a single look-up table to be used to obtain the log visibility vectors. The log visibility vector for each blocker may then be computed based on the center location of the sphere and the radius of the sphere. This allows a compact representation for the visibility vector for each blocker. The coordinates for the center of each blocker that affects the shading at the receiver point can then be easily queried at run-time. Self-shadowing can also be efficiently handled as will be described in conjunction with FIG. 6.

Figure 5:
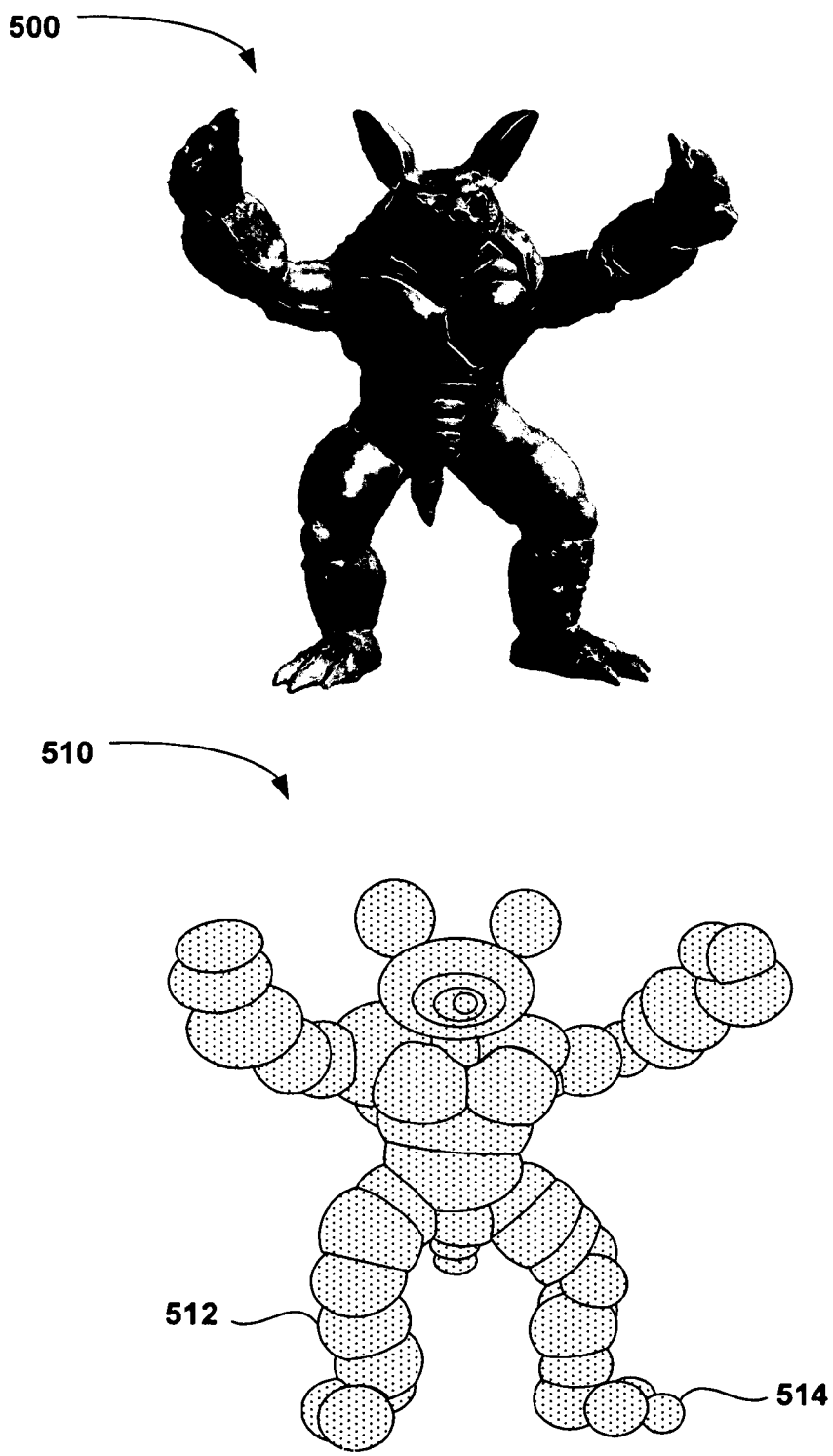
FIG. 5 illustrates a computer-generated object and a corresponding blocker geometric representation of the computer-generated object.

FIG. 5 illustrates a computer-generated object 500 and a corresponding blocker geometric representation 510 of the computer-generated object. The computer-generated object 500 has a geometry T. The blocker geometric representation 510 is formed using spheres (e.g., spheres 512 and 514) to approximate the geometry T of the computer-generated object 500. In generating the geometric representation 510, variational shape approximation is applied. In addition, a set of $n_S$ spheres $S_i$ each having a center $P_i$ and radius $r_i$ are determined that bound the geometry T but have minimal outside volume E. The volume within T's interior may be neglected regardless of how many spheres overlap because shadowing does not need to take into account the number of times light is blocked by a solid object. In addition, the sphere set's bounding property eliminates gaps that would otherwise let light leak though solid objects.

Figure 6:
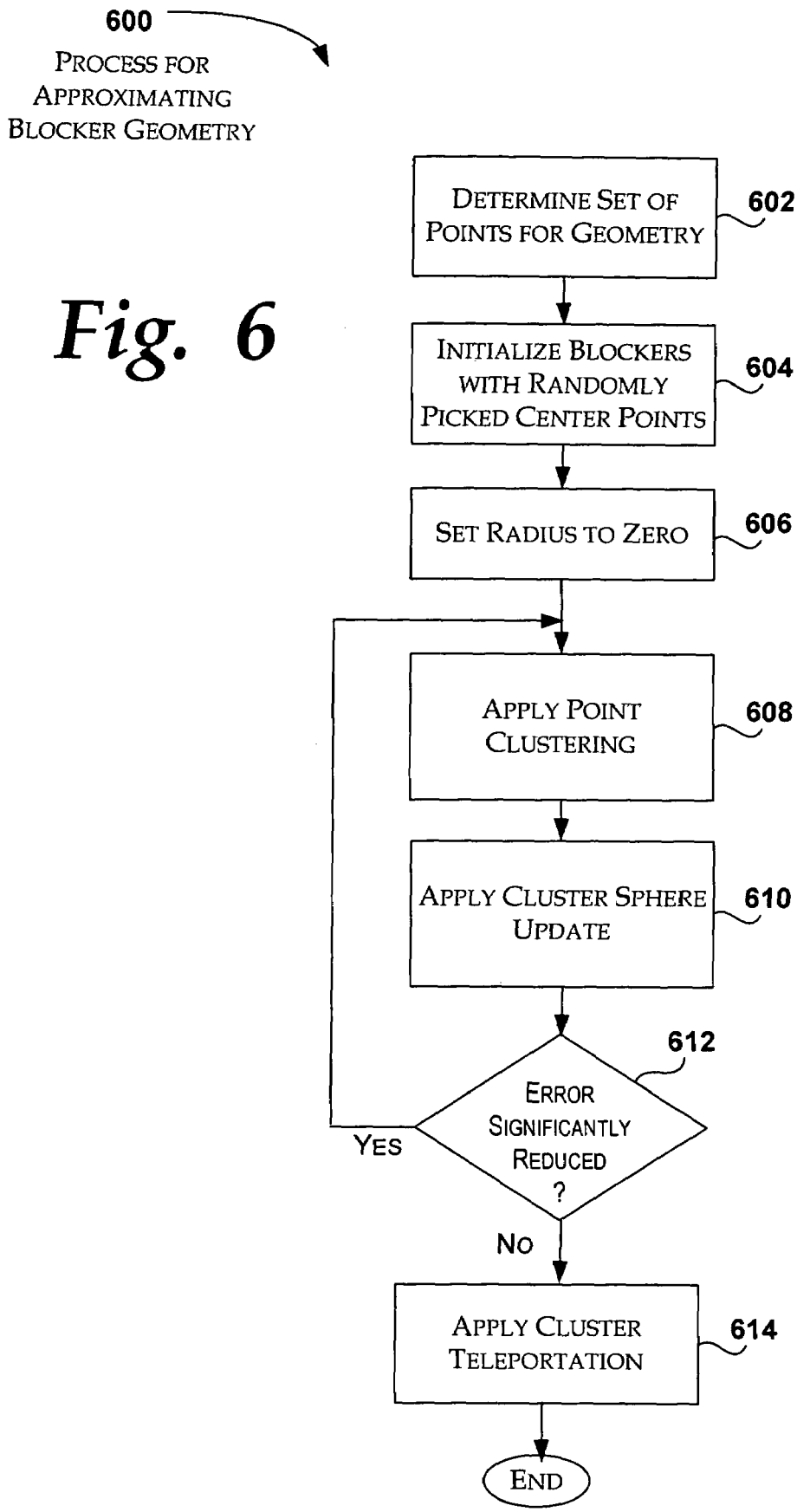
FIG. 6 is a flow diagram illustrating an exemplary process for obtaining a blocker geometric representation of a computer-generated object.

FIG. 6 is a flow diagram illustrating an exemplary process 600 for obtaining a blocker geometric representation of a computer-generated object. Process 600 begins at block 602 where the geometry T is divided into a set of points which include points on the surface (i.e., triangle midpoints) and points in the interior (i.e., grid corners from a mesh voxelization). Processing continues at block 604.

At block 604, initial blockers representing geometry T are initialized with the randomly picked set of points from block 602. Thus, the blockers, which in one embodiment are spheres ($S_i$), are initialized with one of the randomly picked center points $P_i$. Processing continues at block 606.

At block 606, the radius $r_i$ of each sphere $S_i$ is then initialized with the value of 0. The spheres then undergo an iterative process as described below in blocks 608-616, to obtain their optimal shape. Processing continues at block 608.

At block 608, point clustering is applied. Point clustering is performed using a "flood fill" order away from the sphere centers. The flood fill order may be stack-based. The next point is repeatedly popped from the stack and is inserted into the cluster having minimal error. Then, each of the neighbors of the point are inserted onto the stack if the neighbor is not already on the stack. An outside volume error is calculated when adding a point by extending the cluster sphere's radius $r_i$ so as to include the new point. The outside volume of the new sphere is then measured with respect to geometry T. Block 608 is performed until each of the points have been clustered. The set of cluster spheres then may be set to "bound" the set of points. Processing continues at block 610.

At block 610, each cluster sphere center $P_i$ is independently updated. The update attempts to minimize outside volume $V(S_i-T)$ while constraining $r_i$ to continue bounding the cluster's points. The minimal $P_i$ may be found using conjugate gradient. Outside volume of a sphere S, $V(S-T)$, may be computed by summing over the triangles of geometry T of its signed outside volume with respect to S. Processing continues at decision block 612.

At decision block 612, a determination is made whether the last iteration of point clustering and updating significantly reduced the outside volume error or not. If the volume error was significantly reduced, processing loops back up to block 608 to perform another iteration. Otherwise, processing continues at block 614.

At block 614, cluster teleportation is applied. Cluster teleportation is applied to attempt to subdivide the cluster of maximal error into two by finding a pair of points that are farther away from each other in comparison with pairs of other points. The cluster of maximal overlap, defined as the volume the cluster shares with other cluster spheres divided by its own volume, is chosen for deletion. In one embodiment (not shown), after teleporting the cluster center, another iteration of clustering (block 608) and updating (block 610) may be performed. If the error is reduced, the teleported perturbation is accepted. Otherwise, the previous state of the clustered spheres is kept. Processing is then complete.

As geometry T moves between scenes, the corresponding bounding spheres are updated. Model may be animated using "skinning" which applies a weighted combination of tranformations, attached to bones in an articulated skeleton, the mesh vertices. Mean value coordinate (MVCs) for each sphere center $P_i$ with respect to the "rest pose" of the mesh are found. This expresses $P_i$ as a weighted combination of the vertices. Applying the same weights to vertices in a deformed pose yields the corresponding deformed sphere center $P_i'$. The original sphere radius $r_i$ is kept which remains a bound, assuming typical articulated motion. In a further refinement, the vector or vertex MVCs may be pre-multiplied by a matrix of bone weights per vertex to speed up weighting calculations. The sphere center transformation is then expressed as a weighted combination over a few bones rather than over many vertices.

Figure 7:
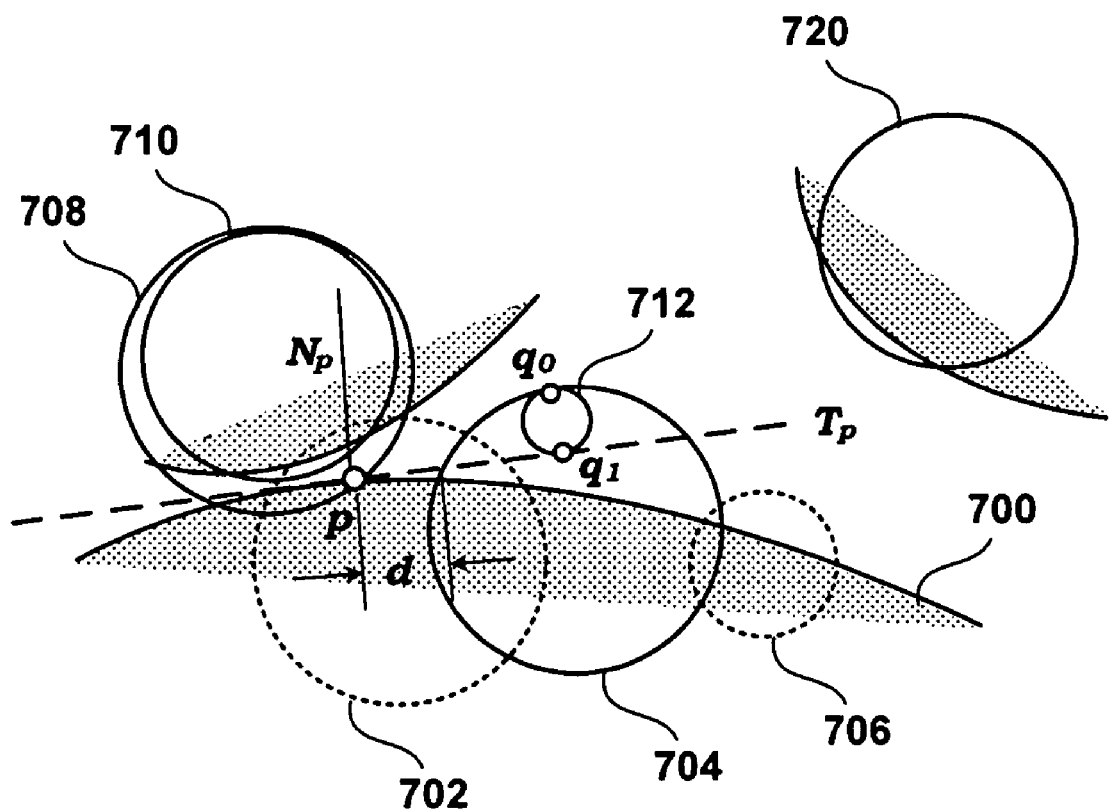
FIG. 7 is a graphic depiction of blocker geometric shapes and their impact on self-shading at a receiver point.

FIG. 7 is a graphic depiction of blocker geometric shapes and their impact on self-shadowing at a receiver point p. As shown, there a number of blocker spheres (e.g., spheres 702-708) and a low-frequency light source 720. A bounding sphere set implies that every point on an object is completely self-shadowed. Therefore, blockers that represent the same local geometry as the receiver (e.g., sphere 700) need to be distinguished from blockers that represent non-local geometry (e.g., sphere 708). Blockers that represent the same local geometry as the receiver cast incorrect self-shadows. At a receiver point p on an object 700, there is an outward-facing normal $N_p$. Together, the receiver point p and the outward facing normal $N_p$ define a tangent plane $T_p$. If a blocker sphere S contains point p, the relationship of S's center to $T_p$ is used to determine whether the sphere is local or non-local. If the center of S is behind $T_p$, S is eliminated (e.g., sphere 202 is eliminated). If the center of S is in front of $T_p$, the radius of sphere S is reduced until it becomes tangent to $T_p$ (see reduction of sphere 708 to sphere 710). The term "behind" means that the center of blocker sphere S is on the opposite side of the tangent plane as the normal for receiver point p. The term "in front" means that the center of the blocker sphere S is on the same side of the tangent plane as the normal for receiver point p. If the receiver point p is outside the blocker sphere S, a simple method accumulates the blocker spheres regardless of its position relative to $T_p$. However, this method produces objectionable banding because different shadows are obtained depending on whether the receiver is inside one or more local blockers. However, entirely eliminating local spheres fails to capture important local self-shadowing effects.

In a further refinement, a blocking sphere S that is outside receiver point p is removed only if it is entirely behind $T_p$ (e.g., blocking sphere 706 is removed). If the blocking sphere partially passes through the tangent $T_p$, the blocking sphere is replaced with a blocking sphere S' that is tangent to and in front of $T_p$ (e.g., block sphere 704 is replaced with blocking sphere 712). S' is determined by a point of maximal distance of S in front of $T_p$, $q_0$, as well as the projection of $q_0$ onto $T_p$, $q_1$. $q_0$ and $q_1$ form a diameter of S' and their midpoint form its center. Using this replacement rule, a spatial discontinuity occurs as the receiver point p moves from inside S to outside. To minimize this spatial discontinuity, the radius of S' is gradually scaled up as a function of p's distance to S along the tangent plane, using the scale factor α as follows:

$$\alpha = \max(1, (\|p-q_1\|-d)/d),  \quad (10)$$

where $d=\sqrt{r^2-(r-\|q_1-q_0\|)^2}$. Radius r is the radius of S and d represents the distance of $q_1$ to the outside of S along the tangent plane.

Once the blockers have been determined, the visibility for each of the blockers is pre-computed so that the product of the blockers can be determined in realtime. Obtaining the product of a collection m blockers, g[1], g[2], ..., g[m] in log space may be denoted as follows:

$$g = \exp(f) = \exp(f[1] + f[2] + \ldots + f[m]). \quad (11)$$

Each f[i]=log(g[i]), where g[i] is the spherical harmonic projection of the corresponding blocker visibility function as follows:

$$g[i]s = \begin{cases} 0, & \text{if object } i \text{ blocks in direction } s; \\ 1, & \text{otherwise.} \end{cases} \quad (12)$$

Because the present soft shadowing technique utilizes equation (11) above, the accumulation of the logs involve vector sums which are independent of the blocker ordering and much cheaper than spherical harmonic products.

The spherical harmonic log used in the present soft shadowing technique is derived based on observations for calculating the spherical harmonic exponential. It was determined that the spherical harmonic exponential could be evaluated using the following equation:

$$g = \exp \cdot (f) = 1 + R_f^T q(D_f) R_f f, \text{ where} \quad (13)$$

$$q(x) = 1 + \frac{x}{2!} + \frac{x^2}{3!} + \ldots = \frac{\exp(x)-1}{x}.$$

$R_f^T$ is a rotation matrix and $D_f$ is a diagonal matrix. Using eigenanalysis of the product matrix g, $Mg=R_g^T q'(D_g) R_g$, yields the following approximations:

$$\log(g) = R_g^T q'(D_g) R_g (g-1)$$

$$q'(x) = 1/q(\log(x)) = \log(x)/(x-1) \quad (14)$$

where the function q' is applied to each diagonal component.

In a further refinement, the eignenvalues of $M_g$ are clipped to avoid applying logs to values that are negative or close to 0 using the following equation:

$$\tilde{D}_g = \max(D_g, \epsilon), \tilde{M}_g = R_g^T \tilde{D}_g R_g \quad (15)$$

Equation 15 then uses $\tilde{D}_g$ rather than $D_g$. Eigenvalue clipping yields smaller error $\|M_g - \tilde{M}_g\|$ compared with clipping values of g(s) over the sphere. In practice, it has been found that setting the threshold $\epsilon$ to 0.02 times the largest eigenvalue works well for low-order spherical harmonic vectors.

FIG. 8 is a set of exemplary spherical harmonics exponentiation calculations 800 suitable for use in the soft shadowing process of FIG. 3. This set of exemplary spherical harmonics exponentiation calculations utilize several exponentiation techniques, such as product series approximation, scalar/matrix exponentials using scaling/squaring, and the like. Exponential technique 802, referred to as PS–p, is a product series evaluation of degree p. Exponential technique 802 was formulated after recognizing that the result of numerical integration or high-order tensors could be approximated by substituting repeated spherical harmonics products for true spherical harmonic powers. Even though this resulted in approximation error, the approximation was typically accurate, especially for vectors representing bandlimited visibility functions. A spherical harmonic product series is based on these repeated spherical harmonic products and is more practical for real-time evaluation. The Volterra series was applied using a Taylor expansion for h(x)=exp(x) to obtain exponential technique 802.

Exponential technique 810, referred to as PS*–p combines a DC isolation technique 812 and scaling/squaring 814 applied to a factored degrees product series 816. Exponential technique 810 analytically computes the exponential of the DC component which reduces the magnitude of the residual vector $\bar{f}$, where the $\bar{f}=(0,f_1,f_2,\ldots f_{n^2-1})$. The scaling/squaring 814 applies where p is a positive integer. The input is divided by a power of 2, the exponential of this scaled input is computed, and then the result is repeatedly squared p times. Scaling/squaring 814 approximates the product series in exponential technique 802. However, it typically reduces errors relative to a spherical harmonic power series $h(f)=(h_0 1 + h_1 f^1 + h_2 f^2 + h_3 f^3 + \ldots)$, where $1=(\sqrt{4\pi},0,0,\ldots,0)$ and $$f^p = \int f^p(s) y(s) ds = \int \left(\sum_i f_i y_i(s)\right)^p y(s) ds.$$

Because exponential squares are more efficient then general spherical harmonic products, this approximation is more useful. Parameter p is chosen as a function of $\|f\|$ using $p=\max(0,\lfloor \log_2 \|f\| \rfloor + 3)$. Results show that typically at most p=3 squaring are needed for low-order ($n \leq 6$) spherical harmonic vectors. Exponential technique 802 may be evaluated by accumulating successively higher powers of f via $f^{p+1}=f^p * f$. Thus, p–1 spherical harmonic products are needed for a degree p expansion. The number of spherical harmonic products can be reduced by segregating even and odd powers as shown in factored degrees product series 816. This results in fewer products which results in smaller truncation error. Thus, factored degree-p product series 816 provides a better approximation than the spherical harmonic power series discussed above. Powers of f can be computed to minimize the number of products in each term: $f^{2*}=f*f$, $f^{4*}=f^{2*}*f^{2*}$, $f^{6*}=f^{4*}*f^{2*}$, and so on. Other conventional factoring techniques may be applied for series degree p>12.

Exponential technique 820, referred to as OL (Optimal Linear Approximation) applies an optimal linear method. For spherical harmonics order-4 or lower, an extension of a simple two-term series $\exp \cdot (f) \approx 1+f$ from exponential technique 802 provides good accuracy without the need for even a single spherical harmonic product. Given an input vector f to be exponentiated, DC isolation 812 may be applied to obtain f̂ and compute the magnitude $\|\hat{f}\|$. Exponential technique 820 can then be used to provide an optimal linear approximation. The coefficients a and b may be pre-determined by generating a set of spherical harmonic vector pairs representing circles of increasingly angular radius. One vector in the pair is the visibility function g and the other it is corresponding log vector f. The DC component of f is zeroed out to account for DC isolation, resulting in f̂. Visibility function g is correspondingly scaled to obtain $$\hat{g} = \exp\left(-\frac{f_0}{\sqrt{4\pi}}\right)g.$$

The least-squares best projection of ĝ onto the orthogonal vectors 1 and f̂ is found via $$a = \frac{\hat{g} \cdot 1}{1 \cdot 1} = \frac{\hat{g}_0}{\sqrt{4\pi}} \text{ and } b = \frac{\hat{g} \cdot \hat{f}}{\hat{f} \cdot \hat{f}}.$$

This results in the minimum error being $\|\hat{g}-(a1+b\hat{f})\|$. The least-squares projection may be performed for each circle of a different angular radius. The resulting a and b coefficients may be tabulated as a function of $\|\hat{f}\|$, which increases with angular radius.

Experimental results show that models agree on their a and b curves over a substantial part of the domain, roughly $\|\hat{f}\|<4.8$, which corresponds to a blocker of angular radius less than 50°. For bigger $\|\hat{f}\|$, the curves follow an initial baseline curve until they suddenly diverge. Thus, asymptotic behavior may be derived for a and b for certain geometry.

Exponential technique 820 may also apply one or more of the other techniques described above, such as scaling/squaring, to reduce the magnitude of the input vector and extend the domain over which accurate results are obtained. When scaling/squaring is applied to the optimal linear method, the resulting technique is referred to as HYB (hybrid of optimal linear method).

Figure 9:
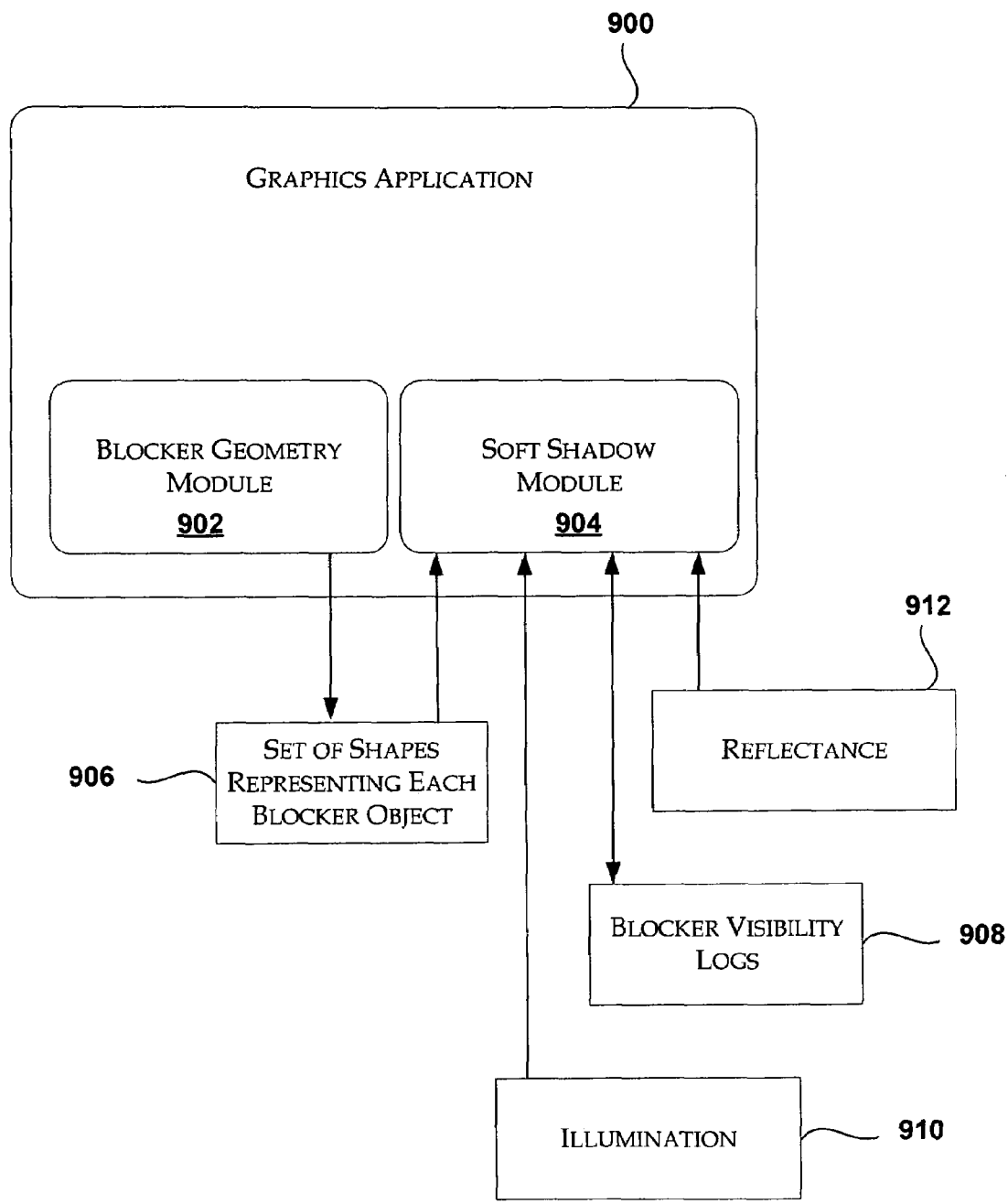
FIG. 9 is a block diagram illustrating exemplary components for implementing the present soft shadowing technique.

FIG. 9 is a block diagram illustrating exemplary components for implementing the present soft shadowing technique. As mentioned above, the exemplary components may be incorporated into a graphics application, implemented as other computer-readable instructions that perform graphics computations, or the like. In overview, the exemplary components include a blocker geometry module 902 and soft shadow module 904. The blocker geometry module 902 is configured to represent each object in a scene using a set of shapes. These shapes are then made available to the soft shadow module 904 for pre-computing blocker visibility logs and for real-time computing of the soft shadow at each receiver point. Thus, soft shadow module includes a preprocessing where the blocker visibility logs 908 are determined and stored and real-time processing where the soft shadows are applied to the objects in the scene. Real-time processing queries the blocker visibility logs 908 to obtain the log for each blocker. As described above, the logs are summed and then exponentiated to obtain a product blocker visibility for all the blockers. The product is multiplied with illumination information 910 and reflectance information 912 to obtain the soft shadows. The lighting and the reflectance may be determined using conventional methods. Thus, as described above, the present soft shadowing technique is able to handle several blockers in real-time.

The present soft shadowing technique handles different types of light sources that may be static or moving. In addition, the technique handles receiver points on dynamic geometry. The following describe some of these variations. For static receiver points, local shadowing effects can be "baked in" by dotting with the precomputed vector $H(N_p)*g_p$, where $g_p$ represents local visibility due to static occluders. The blocker accumulation (block 308) is then performed on blockers from the dynamic geometry. In a further refinement, if the lighting is static, L can be multiplied into $g_p$. For receiver points on dynamic geometry, both static and dynamic blockers are accumulated every frame.

The present soft shadowing technique also handles circular/spherical light sources. In this embodiment, the light source is defined in terms of $L(\theta,d)$ where θ is the angular radius of the light circle and d is the central direction. Local light sources are handled by allowing θ and d to vary as a function of the receiver point p. This may be supported by tabulating $L_H(\theta,\phi)=H((0,0,1))*L(\theta, )$ where θ is the light's angular radius and φ is the angle the central light direction makes with the normal N. For this embodiment, the two dimensional table utilizes a canonical orientation aligning the normal N with z and the light direction in the xz plane, making an angle of φ with z. This canonical configuration is then rotated into its actual orientation at each receiver point before computing the dot product with g. This rotation may be accelerated by fitting a single-lobe ZH model to the 2-parameter family of vectors $L_H(\theta,\phi)$.

In another refinement, a cosine filter in frequency space may be used to window the lighting and visibility functions in order to remove 'ringing' artifacts caused by using spherical harmonics. The cosine filter scales spherical harmonic coefficients in band 1 by $\alpha_1=\cos(\pi/2(l/h))$. It was found that for order-n spherical harmonics, a window size h=2n worked well. It was also found that it may be beneficial to use a greater windowing (i.e., smaller h) for certain HDR lighting environments, depending on their frequency content.

The blocking geometry described above may be further approximated by applying sphere hierarchies. One will note that as a blocker gets closer to a receiver point, detailed knowledge about the blocker's shape is needed to accurately determine the blocker's impact on soft shadows at the receiver point. Likewise, as the blocker recedes further from the receiver point, the blocker's shape may be approximated more coarsely. In a further refinement, the blockers may be grouped in a hierarchical manner and clustered over receiver points. For each receiver point cluster, a cut or list of blocker spheres from an appropriate level of the hierarchy is assembled based on an angle the blocker sphere subtends over the cluster. The log visibility factor is then accumulated at each receiver vertex p in the cluster using a simple approximation that exploits spatial coherence and is based on detailed information computed a single point p* centered in the cluster. By doing so, artifacts from inconsistent blocker approximations used in different clusters may be reduced.

The sphere sets determined in FIG. 6 form leaf notes in the blocker hierarchy. Then, hierarchy levels are constructed one at a time from the leaves up to the root, using a technique based on a conventional clustering technique. Each cluster stores its current bounding sphere. Clustering then iteratively assigns spheres to the closest cluster, based on the distance from the sphere center to the cluster's center. The cluster's bounding sphere is then updated. Initially, the cluster's center is an average center over all the spheres assigned to the cluster. This average is optimized by using the conjugate gradient method to minimize the bounding sphere's radius. After convergence, each cluster is made a parent node in the hierarchy. The spheres assigned to the cluster become the cluster's children. The number of clusters is chosen so that the average branching ratio in the hierarchy is around 4. During animation, the bounding spheres at each parent node are updated bottom-up in the hierarchy by applying a sphere pair bound to successively merge in each child node. Receiver point clusters may be computed using a conventional Lloyd clustering into a manually-specified number of clusters. Experiments have had successful results when a receiver cluster contains several hundred vertices.

These clusters may then be used to compute the log visibility function instead of using individual blockers as illustrated in FIGS. 4-6. First the bounding sphere nodes, $S_i$, with centers $P_i$ and radii $r_i$ are determined that are appropriate for shadowing the cluster. This may be achieved by assuming that the receiver cluster is bounded by a sphere with center $p_R$ and radius $r_R$. Then the blocker sphere subtends an angle less than $\theta_{max}$ if $r_i < \sin(\theta_{max})(\|P_i - p_R\|)$. If $S_i = (P_i, r_i)$ satisfies the above test, the sphere is inserted into the sphere blocker list. Otherwise, the node's children are checked.

For each $S_i$ in the assembled list, two visibility vectors are computed at a central cluster point p*. A bounding log visibility vector $f_b[i](p^*, P_i, r_i)$ applies equation (6) above to the bounding sphere $S_i$. A detailed log visibility vector $f_d[i]$ sums log visibility over all leaf node spheres below $S_i$. This computation may be accelerated by pruning detailed spheres using a minimum angular radius $\theta_{min}$.

A ratio vector, w[i] is then computed that represents the least-squares best per-band scaling of $f_b[i]$ to match $f_d[i]$ as follows:

$$w_l[i] = \left(\sum_{m=-l}^{+l} (f_b[i])_{lm}(f_d[i])_{lm}\right) / \left(\sum_{m=-l}^{+l} (f_b[i])_{lm}^2\right) \quad (16)$$

Diagonal matrix W[i] is derived from w[i] by repeating its component 2l+1 times along the diagonal, as done for the diagonal matrix F in equation (6) above.

The sphere hierarchy may also be used to compute a per-point log visibility vector. This is achieved by using information computed previously at the cluster center p* to accumulate a log visibility vector at p for each receiver point in the cluster. A modified version of equation (6) is then applied to each sphere i in the cluster's blocker list, which multiplies by the ratio vector W[i] as follows:

$$f[i](p, P_i, r_i) = W[i]F(\theta(p, P_i, r_i))y(s(p, P_i)). \quad (17)$$

The vectors are summed over i and the visibility vector is obtained by applying equation (11) above.

As described, the present soft shadowing technique achieves significant savings in processing costs when calculating soft shadows for dynamic scenes in real-time. Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. At least one computer storage media storing computer-executable instructions for performing a method, the method comprising:
    obtaining a plurality of logs, each log representing a log visibility vector for one of a plurality of blockers that cast a shadow at a receiver point in a scene;
    summing the plurality of logs to obtain an aggregate log visibility vector;
    exponentiating the aggregate log visibility vector to obtain a visibility vector; and
    performing a triple product with the visibility vector, a reflectance, and an illumination to obtain a shading value at the receiver point that includes soft shadowing effects.

2. The computer storage media of claim 1, wherein obtaining the plurality of logs comprises querying pre-computed log values.

3. The computer storage media of claim 1, further comprising rotating the log visibility vector based on the receiver point before summing the plurality of logs.

4. The computer storage media of claim 1, further comprising determining a set of blockers out of the plurality of blockers and obtaining logs for the set of blockers.

5. The computer storage media of claim 1, wherein the plurality of blockers are spherical in shape.

6. The computer storage media of claim 5, wherein obtaining the plurality of logs comprise querying pre-computed log values and the pre-computed log values are indexed by a center position and a radius associated with a corresponding blocker out of the plurality of blockers.

7. The computer storage media of claim 1, wherein exponentiating the aggregate log visibility vector comprises applying a simple product series evaluation of degree p on the aggregate log visibility vector.

8. The computer storage media of claim 1, wherein exponentiating the aggregate log visibility vector comprises applying DC isolation and a scaling/squaring technique for a factored degree p product.

9. The computer storage media of claim 1, wherein exponentiating the aggregate log visibility vector comprises applying an optimal linear exponential technique.

10. The computer storage media of claim 1, wherein exponentiating the aggregate log visibility vector comprises applying an optimal linear exponential technique along with scaling and squaring.

11. A computer-implemented method comprising:
    representing an object in a scene as a plurality of blocker shapes;
    determining a log visibility vector for each of the plurality of blocker shapes using a processing unit; and
    storing the log visibility vector for each of the plurality of blocker shapes for later access when computing soft shadows in the scene.

12. The computer-implemented method of claim 11, wherein the plurality of blocker shapes comprise spheres.

13. The computer-implemented method of claim 12, wherein storing the log visibility vector for each of the plurality of blocker shapes comprises storing the log visibility vector indexed by at least one parameter associated with the blocker shape.

14. The computer-implemented method of claim 13, wherein the at least one parameter comprises a center position and a radius of the associated sphere.

15. The computer-implemented method of claim 12, wherein storing the log visibility vector for each of the plurality of blocker shapes uses a canonical orientation.

16. The computer-implemented method of claim 11, wherein the log visibility vector comprises a log of a spherical harmonic projection of a corresponding blocker visibility function.

17. A computing device, comprising:
a processor;
a memory into which a plurality of instructions are loaded, the plurality of instructions performing a method for applying soft shadows to points within a computer-generated scene when executed by the processor, the method comprising:

a) obtaining a plurality of logs, each log representing a log visibility vector for one of a plurality of blockers that cast a shadow at a receiver point in a scene;
b) summing the plurality of logs to obtain an aggregate log visibility vector;
c) exponentiating the aggregate log visibility vector to obtain a visibility vector; and
d) performing a triple product with the visibility vector, a reflectance, and an illumination to obtain a shading value at the receiver point that includes soft shadowing effects.

18. The computing device of claim 17, wherein the log representing the log visibility vector comprises a log of a spherical harmonic projection of a corresponding blocker visibility function.

19. The computing device of claim 17, further comprising rotating the log visibility vector based on the receiver point before summing the plurality of logs.

20. The computing device of claim 17, wherein obtaining the plurality of logs comprising querying the logs which are indexed based on a center position and a radius of a corresponding blocker.

* * * * *